US010949803B2

(12) United States Patent
Nyswonger et al.

(10) Patent No.: US 10,949,803 B2
(45) Date of Patent: *Mar. 16, 2021

(54) RFID INVENTORY AND MAPPING SYSTEM

(71) Applicant: StealthNetwork Communications, Inc., Scotts Valley, CA (US)

(72) Inventors: Margaret O. Nyswonger, Santa Cruz, CA (US); Bradley M. Berlin, Santa Cruz, CA (US); Jack Wang, Sugarland, TX (US); Kris Doane, Newsfield, NH (US); Colin J T Woods, Whittingham, VT (US)

(73) Assignee: STEALTHNETWORK COMMUNICATIONS, INC., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,626

(22) Filed: May 5, 2020

(65) Prior Publication Data

US 2020/0302380 A1    Sep. 24, 2020

Related U.S. Application Data

(63) Continuation of application No. 15/937,069, filed on Mar. 27, 2018, now Pat. No. 10,671,971.

(60) Provisional application No. 62/478,759, filed on Mar. 30, 2017, provisional application No. 62/478,120, filed on Mar. 29, 2017.

(51) Int. Cl.
*G06Q 10/08*    (2012.01)
*G06K 7/10*    (2006.01)
*G06T 19/00*    (2011.01)
*H04N 7/18*    (2006.01)
*G06T 17/00*    (2006.01)

(52) U.S. Cl.
CPC ....... *G06Q 10/087* (2013.01); *G06K 7/10366* (2013.01); *G06T 17/00* (2013.01); *G06T 19/006* (2013.01); *H04N 7/185* (2013.01)

(58) Field of Classification Search
CPC .................... G06Q 10/087; G06Q 10/0875
USPC ..................... 235/385, 375, 487; 705/28
See application file for complete search history.

(56) References Cited

U.S. PATENT DOCUMENTS

| 8,355,961 | B1* | 1/2013 | Ng .................. G06Q 50/28 |
| | | | 705/26.64 |
| 10,559,019 | B1* | 2/2020 | Beauvais .......... G06Q 30/0639 |
| 2007/0035815 | A1 | 2/2007 | Edgar et al. |
| 2013/0262152 | A1 | 10/2013 | Collins et al. |

(Continued)

*Primary Examiner* — Edwyn Labaze
(74) *Attorney, Agent, or Firm* — Edell, Shapiro & Finnan, LLC

(57) ABSTRACT

An inventory system methodology is presented including generating a three dimensional computer representation of an environment using a camera of a mobile device, converting the three dimensional computer representation of the environment into a two dimensional electronic map, scanning, with a scanner that is coupled to the mobile device, a radio frequency identification (RFID) tag, which is coupled to an item that is in the environment, determining a location of the RFID tag based on a location of the scanner in the three dimensional computer representation of the environment when the scanning occurred, and indicating the location of the item, based on the location of the RFID tag, on the two dimensional electronic map.

20 Claims, 10 Drawing Sheets

(56) References Cited

U.S. PATENT DOCUMENTS

| | | | |
|---|---|---|---|
| 2014/0006129 A1* | 1/2014 | Heath | G06Q 30/0222 |
| | | | 705/14.23 |
| 2014/0019200 A1 | 1/2014 | Argue et al. | |
| 2014/0348384 A1* | 11/2014 | Kolehmainen | G06Q 10/087 |
| | | | 382/103 |
| 2016/0063836 A1 | 3/2016 | Fishwick | |
| 2016/0148417 A1 | 5/2016 | Kim et al. | |
| 2017/0018094 A1 | 1/2017 | Todeschini | |
| 2018/0240180 A1 | 8/2018 | Glaser et al. | |

* cited by examiner

FIG.6

RFID INVENTORY AND MAPPING SYSTEM

This application is a continuation of U.S. application Ser. No. 15/937,069, filed Mar. 27, 2018, which claims the benefit of U.S. Provisional Application No. 62/478,120, filed Mar. 29, 2017 and also claims the benefit of U.S. Provisional Application No. 62/478,759, filed Mar. 30, 2017, the subject matter of all of which is incorporated herein by reference in its entirety.

FIELD OF THE INVENTION

Embodiments of the invention are directed to a radio frequency identifier (RFID) tag reader, an inventory and mapping system, and an associated item locating system.

BACKGROUND OF THE INVENTION

The term "inventory counts" has been used in the retail industry for many years. Acquiring accurate inventory counts is both an extremely critical yet time consuming process that every retailer needs to undertake. Timely and accurate inventories are key components in assuring readiness and/or profitability. In the retail field, an inaccurate inventory can not only misrepresent, e.g., a store's performance, but it can also have ripple effects that can affect a store's subsequent years' performance. Oftentimes, the accuracy of inventory can be the difference between profit and loss, and proper analytical decisions based upon accurate data is thus essential to retailers' success. Of course, inventory analysis is not limited to the retail industry, but is also important in manufacturing, the pharmacy and medical fields, military settings, or any other field in which tracking of individual items might be needed.

With the introduction of radio frequency identification (RFID) technology, it is now possible to operate remote scanners to read RFID tags on individual merchandise or items and automatically record inventory information. However, RFID data cannot determine accurate locations of tagged items. This results in situations where workers may have difficulty finding/physically locating specific items when they are clearly in the inventory.

SUMMARY OF THE INVENTION

In one embodiment of the invention, an inventory system methodology is presented including operations of generating a three dimensional computer representation of an environment using a camera of a mobile device, converting the three dimensional computer representation of the environment into a two dimensional electronic map, scanning, with a scanner that is coupled to the mobile device, a radio frequency identification (RFID) tag, which is coupled to an item that is in the environment, determining a location of the RFID tag based on a location of the scanner in the three dimensional computer representation of the environment when the scanning occurred, and indicating the location of the item, based on the location of the RFID tag, on the two dimensional electronic map.

In another embodiment of the invention, an inventory system is presented including a mobile device comprising a camera, a display and a radio frequency identification (RFID) scanner; and a server, communicatively coupled to the mobile device. The system configured to: generate a three dimensional computer representation of an environment using the camera, convert the three dimensional computer representation of the environment into a two dimensional electronic map, scan, with the scanner, a radio frequency identification (RFID) tag, which is coupled to an item that is in the environment, determine a location of the RFID tag based on a location of the scanner in the three dimensional computer representation of the environment when the scan occurred, and indicate the location of the item, based on the location of the RFID tag, on the two dimensional electronic map.

Numerous objects, features and advantages of the invention will be readily apparent upon a reading of the following detailed description of embodiments of the invention when taken in conjunction with the accompanying drawings. It is noted that the drawings employed herein are for the purpose of description and should not be regarded as limiting.

BRIEF DESCRIPTION OF THE DRAWINGS

The features, objects and advantages of the invention noted above will become more readily apparent to those ordinarily skilled in the art after reviewing the following detailed description and accompanying drawings, in which:

FIG. 6 illustrates an example search screen that depicts locations of items on a map according to an embodiment of the invention.

DETAILED DESCRIPTION OF PREFERRED EMBODIMENTS

Embodiments of the invention enable determining a current location of an RFID-tagged item based on its surrounding environment. Determining the current location of an item is accomplished via a multi-layered approach. As will be explained in more detail below, an area definition file (ADF) of a selected area may first be created by using a camera on a mobile device such as a smartphone, which may be paired with an RFID scanner. In one example implementation, the smartphone is programmed with Google Tango, an application that uses a device's computer vision to detect its position relative to the world around it without using GPS or other external signals. Applications like Google Tango enable indoor navigation, 3D mapping, physical space measurement, and environmental recognition. Embodiments of the present invention have been implemented using Google Tango, and the description below refers to selected Google Tango functionality. However, those skilled in the art will appreciate that other environment imaging applications could also be used in the context of the described embodiments.

Thus, using an environment imaging application, the ADF is built using computer vision technology by capturing distinct imagery of the environment a user is in, and when the ADF is subsequently loaded and used, the location of the user can be determined at any given instant in time. The methodology, in one embodiment, then creates a 2D map based on the ADF. While the user moves in the environment, the 2D map and related coordinates are automatically generated and inventory items are mapped to the 2D map. With both the coordinate information and the 2D map available, location indication pins for items that are desired to be located can be placed on the map at the appropriate locations.

The calculation of an RFID tag location is based on the current location of the user based on the ADF and 2D map at a given time (timestamp) as well as the Received Signal Strength Indicator (RSSI) of a signal received from a given RFID tag at that same time. The RSSI, while helpful in identifying how far away the signal originates, does not provide directional information. The ADF and 2D map fill in that information, giving both location and orientation of the user holding the device. A triangulation calculation based on multiple possible received signals is performed to determine the approximate location of the detected RFID tag.

With both the 2D map coordinates and the RFID location, embodiments described herein may then utilize augmented reality to help the user navigate through his/her current surroundings and lead the user to the location of a selected item, thus achieving much greater efficiency at finding items.

Figure 1:
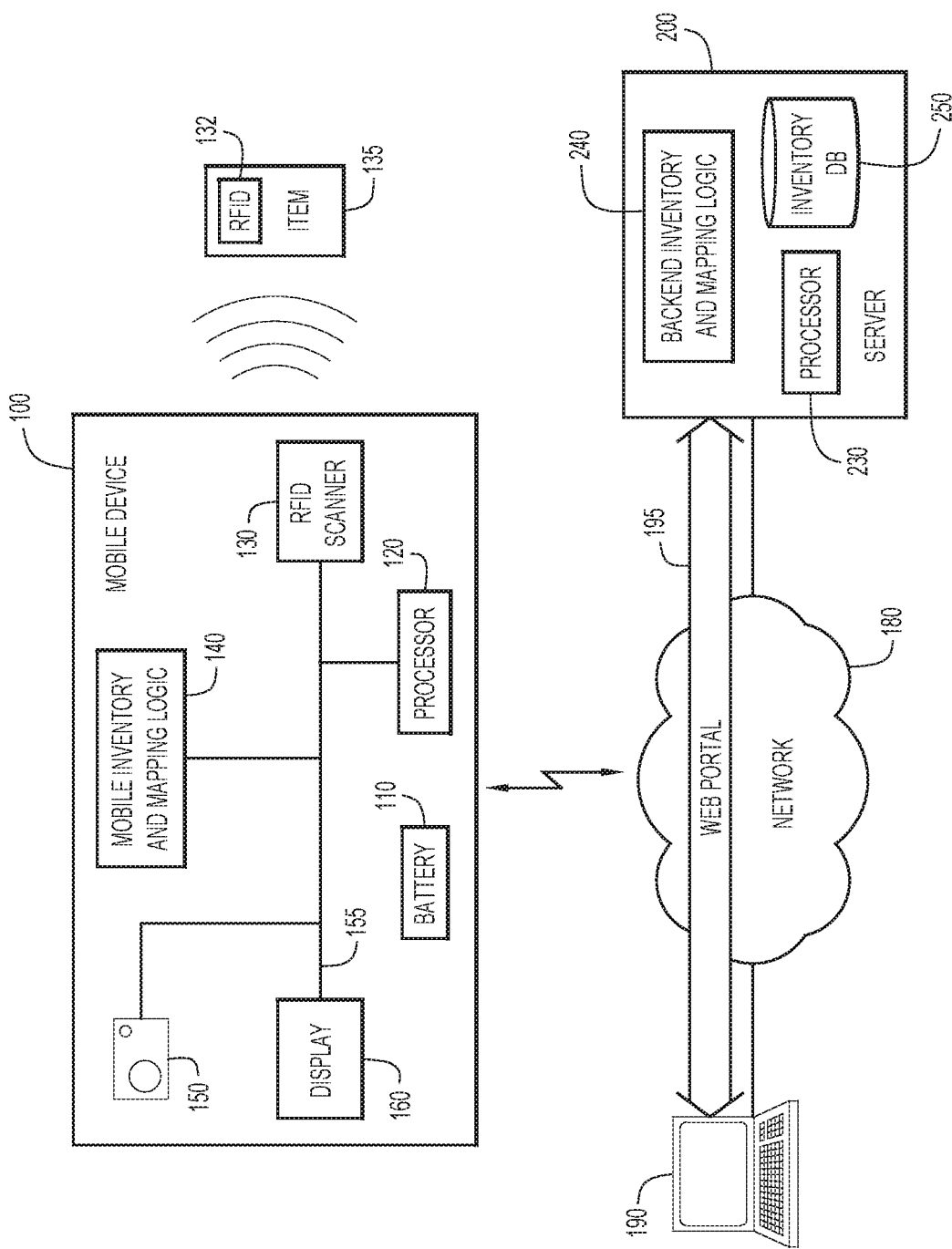
FIG. 1 is a block diagram illustrating a mobile device and backend system for mapping a selected area, scanning RFID tags, determining locations of respective RFID tags, and displaying items using augmented reality according to an embodiment of the invention.

FIG. 1 is a block diagram illustrating a mobile device and backend system for mapping a selected area, scanning RFID tags, determining locations of respective RFID tags, and displaying items using augmented reality according to an embodiment of the invention. As shown, mobile device 100 may be a custom device, a smartphone, or a device paired with a smartphone, or any other electronic device configured to perform the functions described herein. Mobile device 100 includes a (rechargeable) battery 110, a processor (such as a microprocessor, microcontroller, etc.) 120, an RFID reader (or scanner) 130 that can read or scan an RFID tag 132 on a given item 135, mobile device inventory and mapping logic 140 (e.g., logic or software instructions) stored in a memory (ROM, RAM, etc., not shown) and executable by the processor 120, a camera 150, and a display 160. The RFID reader 130, mobile inventory and mapping logic 140, camera 150 and display 160 are connected to at least the processor 120, via, e.g., a data bus 155.

FIG. 1 also shows that mobile device 100 is in wireless communication with a backend server 200 via network 180. In an embodiment, server 200 includes a processor 230, backend inventory and mapping logic 240 (e.g., logic or software instructions) stored in a memory (ROM, RAM, etc., not shown) and executable by processor 230, and inventory database 250, which are both described more fully below.

Wireless communication may be implemented with relatively short distance technologies such as Bluetooth, or wireless local area network (LAN) technology (e.g., Wi-Fi), or relatively long distance technologies such as cellular 3G or LTE technologies.

FIG. 1 also shows a user terminal (e.g., a computer) 190 that can be used to access data and files on server 200 via a web portal 195 (e.g., a World Wide Web browser application).

Figure 2:
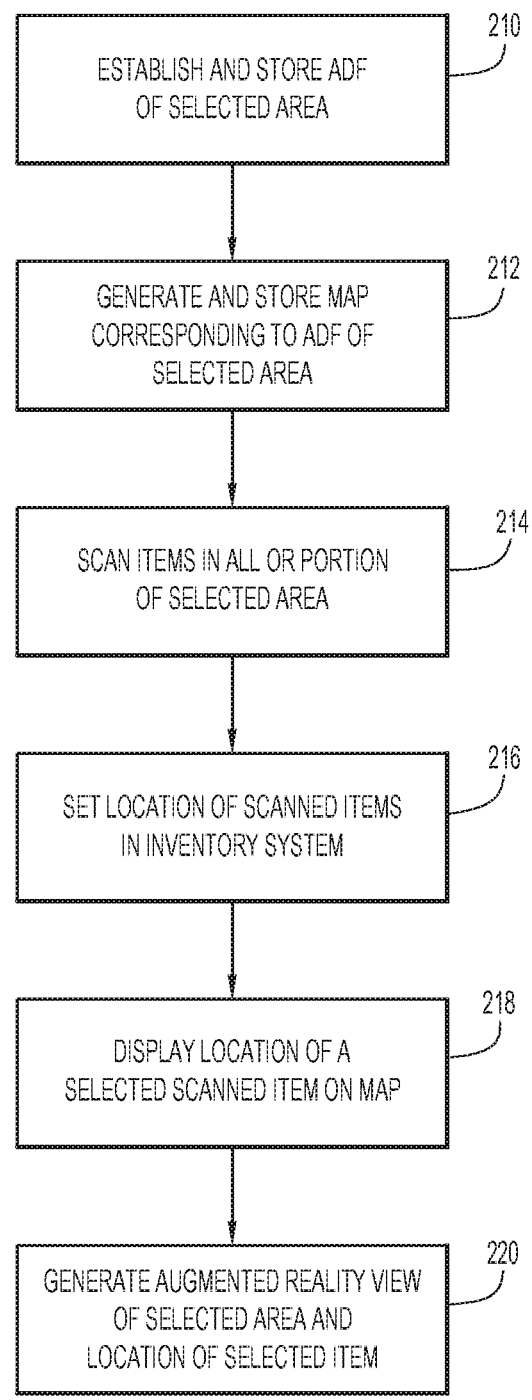
FIG. 2 is a flowchart illustrating a series of operations according to an embodiment of the invention.

FIG. 2 is a flowchart illustrating a series of operations according to an embodiment of the invention. At 210, the methodology establishes and stores an ADF of a selected area. At 212, a (2D) map corresponding to the ADF is generated and stored. At 214, inventory items in all or a portion of the selected area are scanned. At 216, the location of the scanned items are determined or set. At 218, a selected scanned item, whose location was previously set, is displayed on a rendering of the map. At 220, the methodology generates an augmented reality view of the selected area and location of a selected item. The foregoing operations are described in more detail below.

Figure 3:
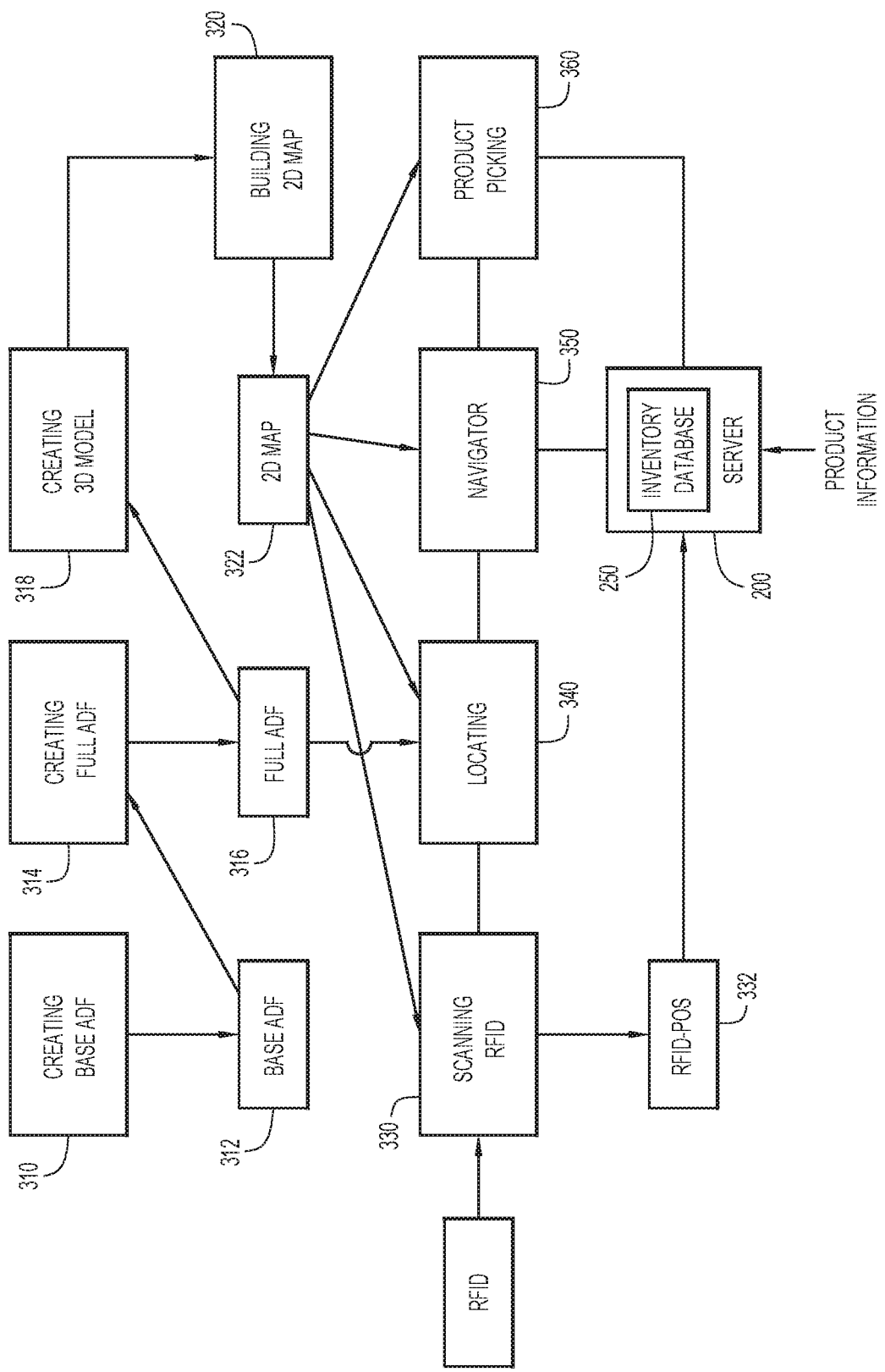
FIG. 3 is a functional block diagram of a system for creating a map of an area, locating items in the area, and fusing the same in an inventory database, among other functions according to an embodiment of the invention.

FIG. 3 is a functional block diagram of a system for creating a map of an area or environment, locating items in the area, and fusing the same in an inventory database (e.g., inventory database 250), among other functions, according to an embodiment of the invention. FIG. 3 further elaborates on the several operations outlined above with respect to FIG. 2.

Base ADF.

Referring to FIG. 3, at 310, a base ADF is created. As noted, the ADF is used to characterize an indoor environment by utilizing camera 150 on, e.g., a smart phone or tablet computer. First, a base ADF 312 is created based on an environment or space where minimal changes in decoration or lighting occur. This base ADF 312 can then serve as the origin of subsequent ADFs for that same space. If the environment or space changes for any reason, the base ADF may become invalid and may need to be re-created with the new environment. ADFs created based on an invalid base ADF would then also be invalid and would need to be re-created.

Full ADF.

At 314, full ADFs 316 are created by extending from an existing base ADF. For example, base ADF 312 might have a size of no more than 50 MB. Once the base ADF 312 is chosen and loaded, the full ADF 316 can be created by, e.g., walking around the target environment or space. Ideally, the full ADF 316 is no larger than 600 MB, which, with present memory and processing technology, is a practical size.

Creating Multiple Full ADFs.

Multiple full ADFs can be created using one base ADF. If one base ADF is associated with multiple full ADFs, these ADFs all have the same origin (the base ADF) and their coordinates are the same. Multiple ADFs can be very useful because lighting conditions of large environments tend to change depending on time of day and, in order for full ADFs to be effective, multiple full ADFs can be created for the same environment with different lighting conditions. With one base ADF as the origin, these full ADFs can be coordinated to have the same coordinate system. The ADF creation process may be performed by mobile inventory and mapping logic 140.

At 318, a 3D model of the space or area is created. The 3D model is based on the full ADF 316. Such a 3D model, however, may not be needed for purposes of the instant embodiments since most inventory items are likely to be within reach of a user, and thus a 2D map may all that may be needed. 2D maps also require significantly less memory. Of course, in the case where inventory items are distributed at different heights, or the given implementation so warrants, it may be desirable to maintain the 3D model for guiding users to locations of inventory items. Inventory items might also be relatively small, and thus could be arranged in columns or on multiple shelves, thus again perhaps making a 3D model useful.

Map Creation.

At 320 the 2D map 322 is built or created. Map 322 is created using the target full ADFs. The purpose of creating a map is to identify, e.g., the boundaries and furniture within the environment. The map may be created using, e.g., Google Tango. In such a case, the user first chooses a full ADF that corresponds to the environment and the current lighting condition, then the mapping process proceeds by having the user walk around the boundaries of the environment with camera 150 operating. The ADF creates the area definition file that records the environment into a binary format. Mapping is performed "on top of" the ADF. In order to map a given area or floor, the system loads into the ADF, thus enabling the identification of user location and environment, and then records the map coordinates. Thus, a base ADF is generated, multiple full ADFs are tied to an origin (0,0) of the based ADF and a the 2D map 322 is further tied to the same original. Map creation may also be performed by mobile inventory and mapping logic 140. Once the map 322 is completed, it can be saved and uploaded to server 200, and in particular, backend inventory and mapping logic 240 (and memory associated therewith).

Post and Manual Processing.

When the 2D map 322 is uploaded to server 200, post processing may be performed. In an embodiment, the map 322, a file in, e.g., a .png file format, is extended so that it can be used by the mobile device 100 and fit the screen size of the display 160. This post processing may also slightly rotate the map 322 file based on the origin (base ADF) location and where the mapping process begins.

The map 322 (and ADFs) can also be downloaded to, e.g., user terminal 190, by logging into server 200, e.g., via a web portal 195, modified and re-uploaded through web portal 195. For example, a user can use the 2D map 322 as a base layer in Photoshop™ or other imaging software, and overlay, smooth or perform any other operation on top of this layer.

Once completed, map 322 is used as the base for other functions in the system. For example, map 322 serves as the background of the application where user locations, item locations, pending tasks, etc. are pinned onto the map 322 in connection with various display functions within the system.

Figure 4:
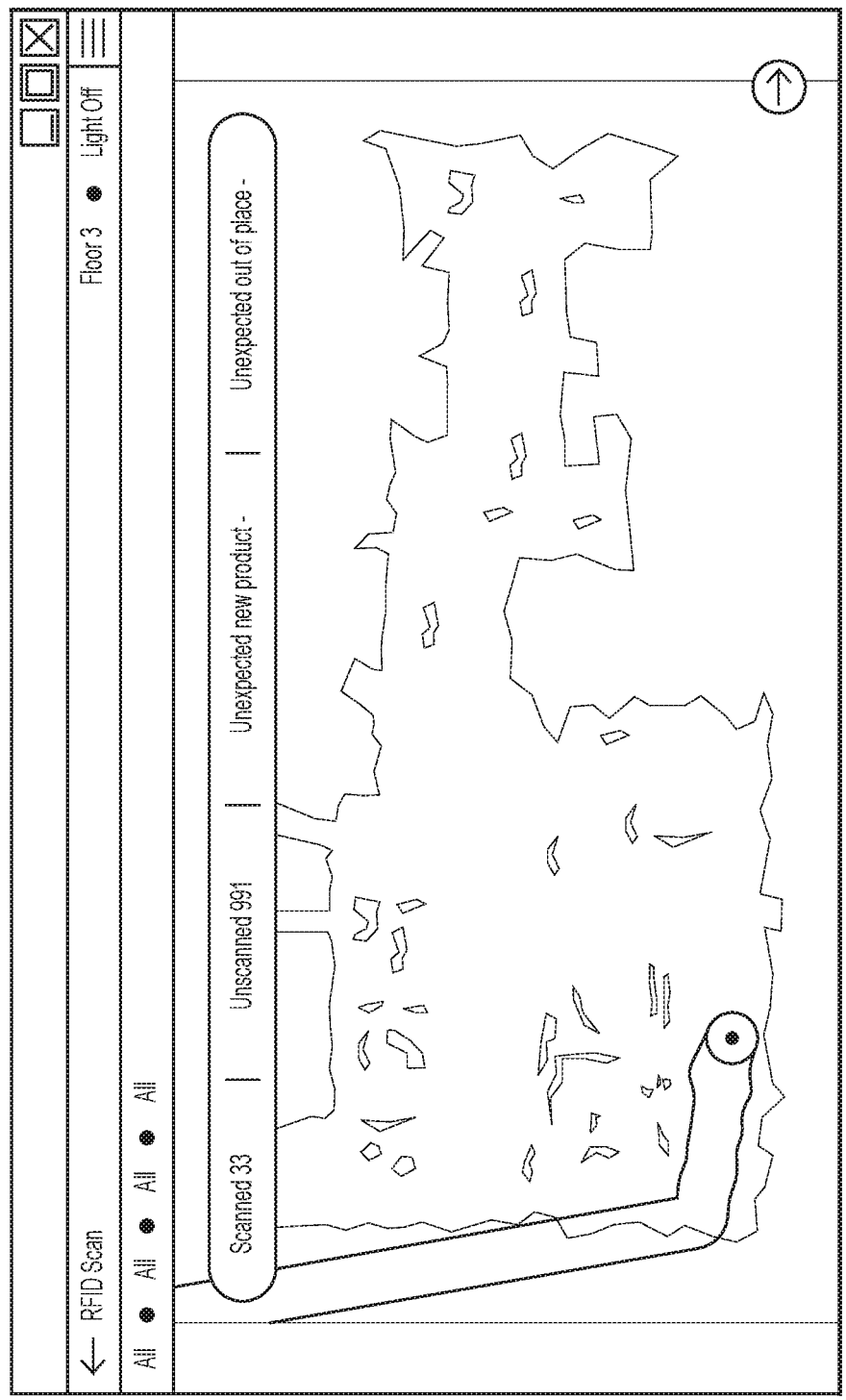
FIG. 4 depicts a path of user being tracked while performing a scanning operation according to an embodiment of the invention.

FIG. 4 depicts a path of user being tracked while performing a scanning operation, according to embodiment of the invention. This functionality corresponds to the scanning RFID function 330 shown in FIG. 3.

During the scan process, the user's location and corresponding timestamps are identified and recorded by using the full ADF 316. As the user walks in the environment to scan items (FIG. 4), the location of the user constantly changes, and is updated, and recorded by, e.g., mobile inventory and mapping logic 140. Correspondingly, at each location, RFID signals received by the mobile device 100 (which is held by the user) are also recorded in the system. This data (RFID-POS 332) is then used to calculate the coordinate, i.e., the location, of the RFID tags. As shown in FIG. 4, the logic 140 enables the user to visualize, in real time, his or her location during the scan on the map. At the beginning of the scan, the entire 2D map 322 shown on display 160 may be grayed out, but as the user starts to walk in the environment, the location where the user has been will be cleared and white. This feature serves as a visual reminder to the user to constantly alert him or her which areas of the environment the user has not yet scanned. In connection with scanning function 330, logic 140 may also tabulate the number of items scanned during the process, giving clear indications of the progress of the scan. Once the full scan is completed, recorded data are saved and uploaded to the server 200 for processing RFID tag locations.

Although it is desirable to fully scan an entire are covered by a given, map, it is also possible to complete a partial RFID. Such a partial RFID scan is performed the same as the full scan, but the map 322 shown would, of course, not be fully whited out. The user can simply terminate the scan process at any time and when submitting the data, the logic 140 may be configured to prompt the user to choose either a full or partial scan. Certain calculation and data processing may be handled differently (discussed below) depending on whether a full or partial scan has been completed.

RFID Data Collection Control.

In an embodiment, the RFID scanner 130 in the mobile device 100 can be controlled/configured through user terminal 190 and the web portal 195 to server 200. For example, a user may configure/change several parameters related to the RFID scanner 130 including Max Power, Session, Anti Collision Mode, and Anti Collision Population. These parameters may be set based on recommendations of a given RFID vendor. However, due to environmental factors, etc., it may be desirable to have better control over these parameters to achieve improved scanning results.

Calculation of RFID Locations.

Once the user completes the scan, all relevant data including RFID data and user location data are uploaded to the server 200 via network 180. Similar to the RFID data collection control, where parameters of the scanner 130 can be modified, the data used for calculating RFID tag locations can also be filtered and changed through the web portal 195 and user terminal 190. Testing has demonstrated that a most desirable filter rate is on the order of 90%, meaning that only about the top 10% of the strongest RFID signals are selected for the calculation, and thereby ensure the accuracy of the calculations. However, those skilled in the art will appreciate that such a filter setting can be changed as needed, e.g., 85%, 80%, 75% or 70%, as examples.

Figure 5C:
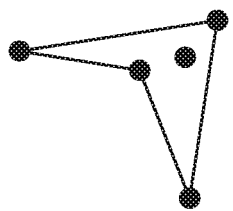
FIGS. 5A-5C illustrate possible shapes on which centroid calculation can be performed to identify a location of a given RFID tag according to an embodiment of the invention.
Figure 5B:
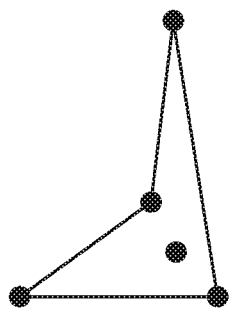
Figure 5A:
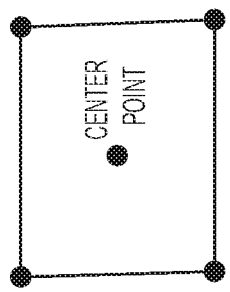

Once all data are filtered, the filtered clean RFID data along with their corresponding user location data are used to calculate accurate locations of the RFID tags. This function is performed by 340 in FIG. 3. First, multiple RFID signals from the same tag are selected. Through them, the corresponding user locations are found, so that the system understands when and where each of these RFID signals has been received. These locations form a polygon (examples of which are shown in FIGS. 5A-5C). The polygon is then processed to identify the centroid of the geometric shape by the following formula:

$$C_x = \frac{1}{6A}\sum_{i=0}^{n-1}(x_i + x_{i+1})(x_i y_{i+1} - x_{i+1} y_i)$$

$$C_y = \frac{1}{6A}\sum_{i=0}^{n-1}(y_i + y_{i+1})(x_i y_{i+1} - x_{i+1} y_i)$$

where n is defined by the number of vertices (or the number of user locations where the RFID tag signal was recorded), and A is the polygon's area:

$$A = \frac{1}{2}\sum_{i=0}^{n-1}(x_i y_{i+1} - x_{i+1} y_i)$$

$C_x$ and $C_y$ define the centroid of the polygon, and therefore the location of the RFID tag. Each tag is processed in the same way until all tags are processed.

Partial scan results are processed slightly differently, as mentioned above. After all tag locations have been processed using the above process, partial scan results are filtered based on the positions of the users. In one implementation, for a particular RFID tag, if its position calculated is more than 5 feet away from where the user has been, this tag data and position are ignored. Because of the nature of RFID signals, some strong signals can be received 7-10 feet away from the scanner. However, if the user has never been close to the tag and the numbers of signals are low, the location of the tag will be calculated to be 7-10 feet away where the user received the original signal, resulting in inaccurate tag locations. Therefore, in an embodiment, all such results are filtered and disregarded during the partial scan process.

Overall, by combining the RFID signal strengths and the user location data, the system can calculate the RFID tag locations with an accuracy within 3 feet of the item's actual location. Each location result has a corresponding coordinate system that matches the ADF 316 and 2D map 322. As a result, all calculated RFID tag locations can be accurately displayed on the 2D map 322 via display 160, enabling a user to see where every scanned item is and help them find items quickly.

Item Search and Navigation

EPC to UPC and UPC to EPC Conversion.

When RFID tags are scanned by reader 130, the corresponding EPCs (Electronic Product Code) are recorded in the system. However, items in the environment are usually labeled with UPC (Universal Product Code). In an embodiment, backend inventory and mapping logic 240 hosted by server 200, while calculating and processing each tag location, also performs the conversion between EPC and UPC in the database 250. The EPC/UPC information (product information) is preferably loaded into server 200 before any scanning takes place (FIG. 3). As a result of the conversion of association between EPC and UPC, each EPC should have a corresponding location, and a corresponding UPC in the database 250.

Item Search.

Figure 6:
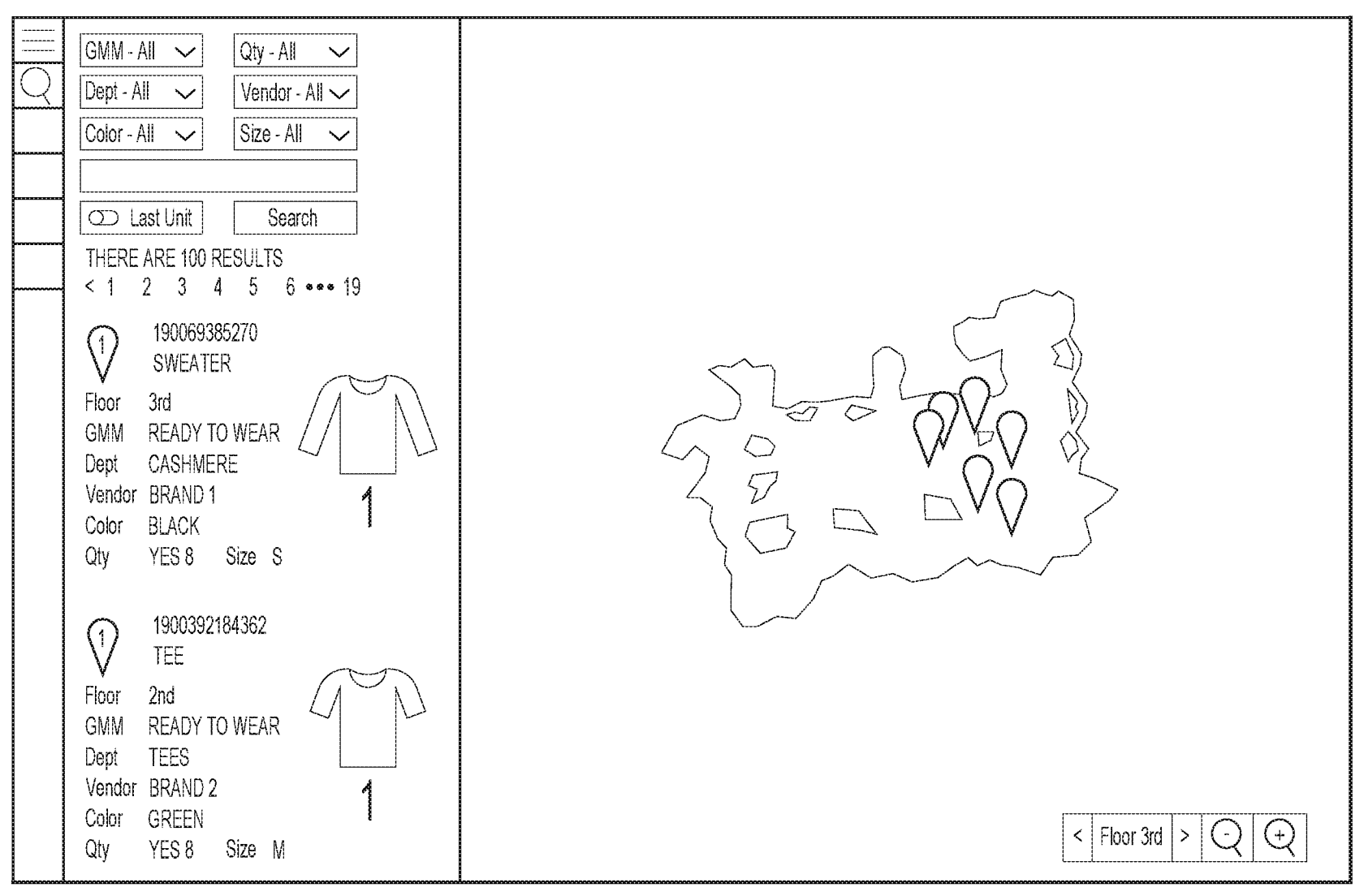
Figure 7:
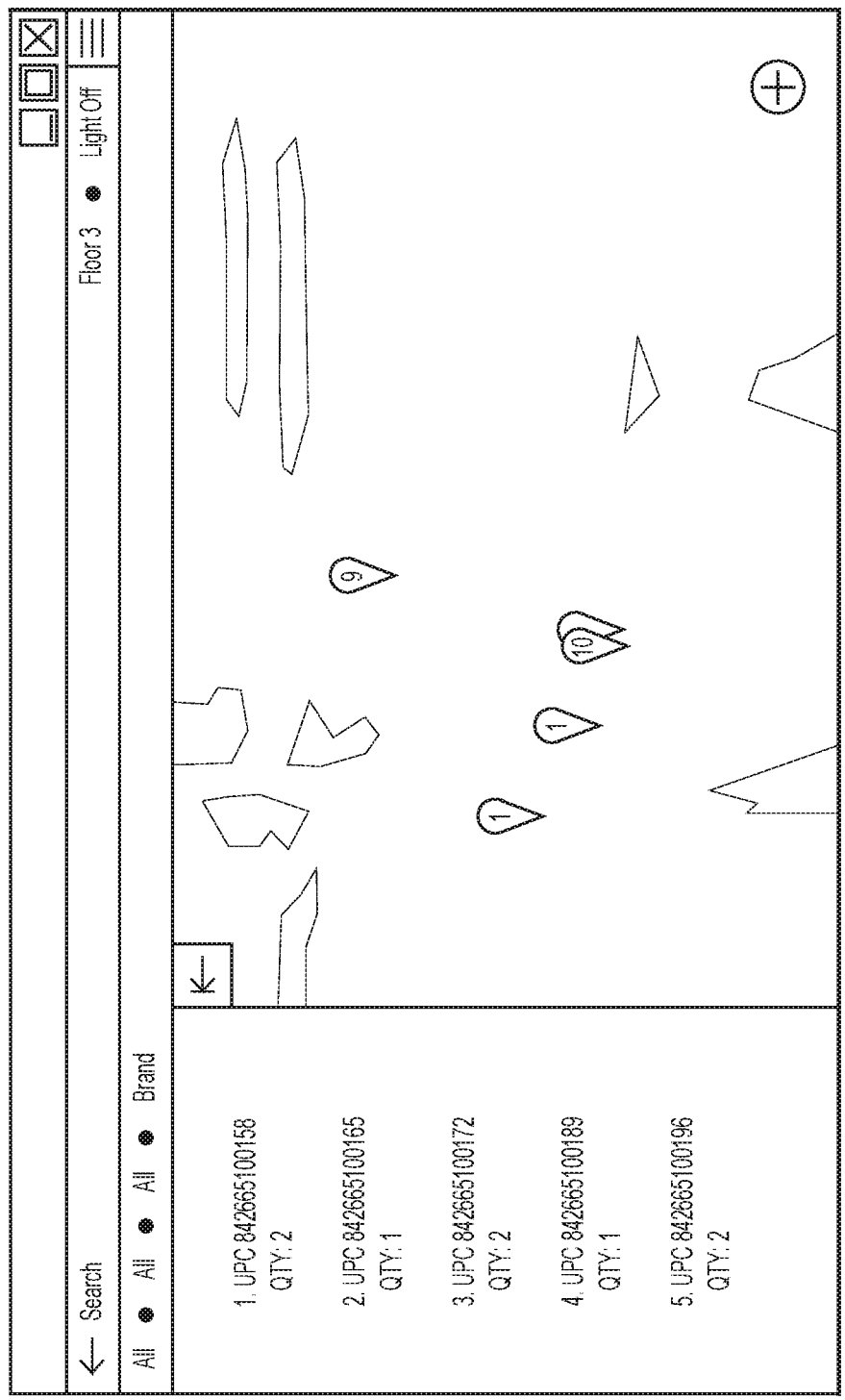
FIG. 7 illustrates another example search screen that depicts locations of items on a map according to an embodiment of the invention.

The embodiments described herein allow users to enter a UPC number to search for the location(s) of the corresponding item(s). Keep in mind that each UPC may correspond to multiple items. All items with this UPC number are pulled from the database 250 and their locations marked on the map (displayed on display 160 and/or on user terminal 190). FIG. 6 illustrates an example search screen that depicts locations of items on a map, according to an embodiment of the invention. The combination of 2D map 322 and item locations allows the user to see 1) whether the items he/she is searching for actually exist, 2) if they do exist, where they are in the environment, and 3) how many items of said UPC exist. FIG. 7 illustrates another example search screen that depicts locations of items on a map, according to an embodiment of the invention. The example of FIG. 7 does not include pictures or thumbnails of the items.

Visual Navigation.

Figure 8:
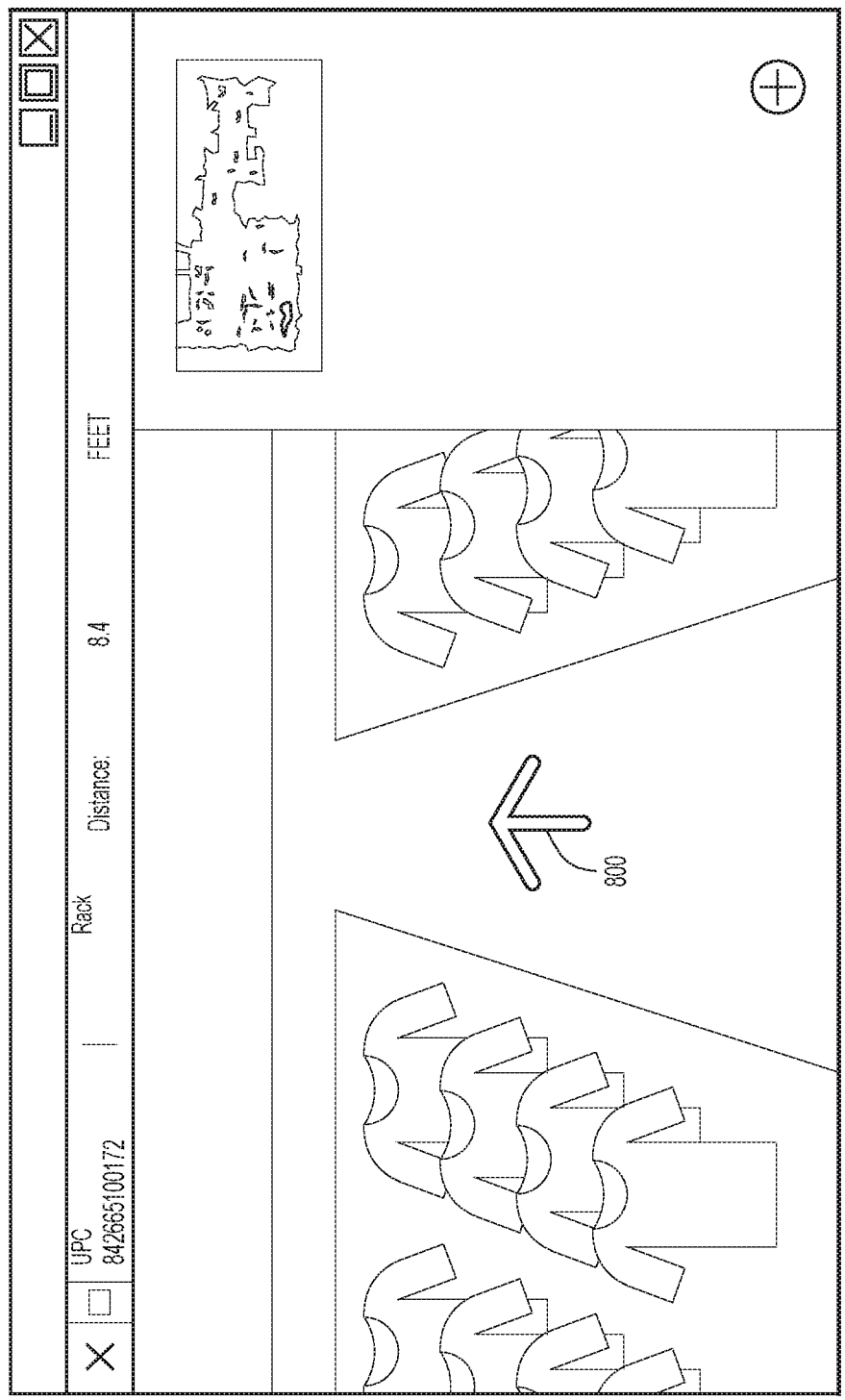
FIGS. 8 and 9 are example views with overlaid augmented reality information to help a user locate a given RFID tagged item according to an embodiment of the invention.
Figure 9:
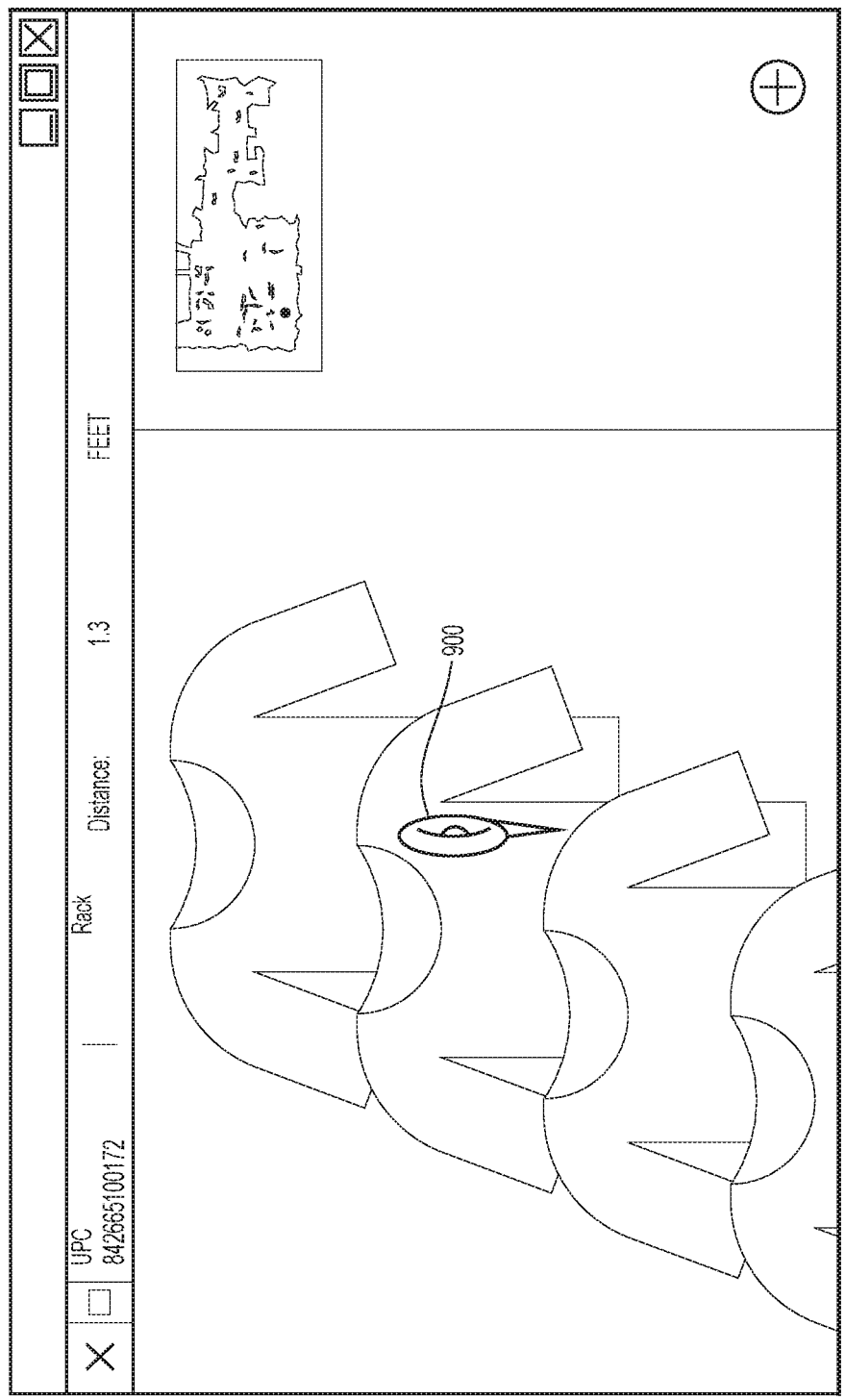

Once the user has selected an item from the search list, mobile inventory and mapping logic 140 enables, in connection with navigator function 350 (FIG. 3), an Augmented Reality (AR) navigation mode. This mode utilizes the camera 150 on the mobile device 100 and overlays item information such as picture of the item, product identifier (PID), UPC, quantity, department, vendor, color, size, etc. on top of the camera feed. FIGS. 8 and 9 are example views with overlaid augmented reality information to help a user locate a given RFID tagged item, according to an embodiment of the invention. As further shown in those figures, overlaid on top of the screen is also an arrow (FIG. 8, 800) that shows the general direction of where the item is, a (color highlighted) number indicating how many feet away is the user's location from the item location, as well as a 2D map on the top right corner with a (color highlighted) dot indicating the current user location and a (color highlighted) dot indicating the item location. When the user is within three feet of the item, the arrow may transition to a circular object/pin (FIG. 9, 900) indicating to the user that the item is around him/her. The Augmented Reality data is obtained from the RFID location calculation, and the system is able to guide the user to the item location with an accuracy of 3 feet.

Auditory Feedback.

In addition to visual guidance, when the user gets within 3 feet of the item, the system may give auditory feedback, in the form of, e.g., a beeping sound, to the user regarding the proximity of the user to the location of the RFID tag. For example, when the user gets closer to the RFID tag 132, the auditory feedback may become stronger and beep more frequently. This proximity feature mat be based on, e.g., evaluating the signal strength of the RFID tag 132 of the item 135 being sought. When the user gets closer to the RFID tag 132, the inherent signal strength increases. As the signal strength increases, the frequency of beeping may be controlled to increase proportionally until it reaches maximum frequency when the signal strength is strong enough to indicate that the mobile device 100 (and presumably the user holding the device) is right next to the item 135.

Inventory Management Functions

FIG. 3 further shows product picking functionality 360. These functions refer to, e.g., a user finding a given item, picking it up (removing it) for purposes of returning to vendor (RTV), shipping to customer, price changes, or relocating. These functions are described below.

Remove.

A "remove" function can be used after an item has been found. The main purpose of the remove function is to remove a particular item's data/profile from the database 250 so that when the next user searches for it, it will indicate that it no longer exists. Backend inventory and mapping logic 240 may be configured to require very specific EPC-level confirmation in order to remove an item from the inventory. For example, the user may need to scan the particular item he/she wants to remove and confirm the removal action before the system allows the action to proceed. "Batch remove" is also possible by scanning all targeted items and confirming the removal action. In one implementation, when the removal function is activated, the system does not delete the item data from database 250, but instead labels the data as "removed." Accordingly, all removed items can be viewed via the web portal 195 to track the removal functions and user actions.

Relocate.

A "relocate" function may be used to move an identified item to a different coordinate on the 2D map. When the next user searches this item, the position data will reflect the new coordinate on the 2D map. Similar to the remove function, backend inventory and mapping logic 240 may be configured to require EPC-level specificity to confirm the relocation action. In one possible implementation, the user first scans the item, then walks to the new location and scans again. The system will immediately put the user's most recent location as the item's location after receiving the second scan. The coordinate is assigned and the result is reflected immediately. If the user searches this newly relocated item again, it will show up at the new location. Again, all relocated items can be viewed on, e.g., user terminal 190, via web portal 195, to track the relocate functions and user actions.

Item Filter.

In addition to searching a given item via its UPC, backend inventory and mapping logic 240 also allows parameter filters to narrow down the search. These filters include, e.g., department, vendor, color, size, etc. All items matching the filter show up as part of the search results. This enables the user to search for items for which they do not know the UPC. Unlike UPC searches where very specific items are found, filter searches can identify a much broader range of items. All items found, whether through UPC search or filter search, can go through the remove and relocate process.

Multi-Floor System.

Embodiments described herein allow the storing of multiple environments, multiple ADFs with different base ADFs (origins) and multiple maps associated with these ADFs. All ADFs and maps uploaded to server 200 system may be tracked via the web portal 195 and can be downloaded or deleted manually. When a user searches an item and the item's location is in an entirely different environment from where the user currently is, the backend inventory and mapping logic 240 in coordination with mobile inventory and mapping logic 140 may notify the user regarding which environment the item is in, and may further ask permission to change the ADF and map to that particular environment. Once the user is in the new environment, the navigation system will localize the user, identify where he/she is relative to the origin, and guide the user to the item using both visual and auditory systems, as outlined above.

Web Portal Functions

Inventory.

The web portal 195 allows the user with appropriate login credentials to see all inventories scanned by the system. All items can be searched by both UPC and filter search functions. The search results appear on the same 2D map on the web portal 195 as the mobile device 100 with pins indicating where the searched items are located. When a pin is selected by, e.g., a touch, or mouse click, details of the associated product may be displayed including picture, GMM (General Merchandise Manager) information, department, division, vendor, color, quantity, and the environment it is in.

Scan.

Scan functionality tracks all the full and partial scans the user has conducted. It allows the user to, for example, select two scans from the history list from the same environment to compare the scan results in order to identify what the differences are in terms of the items scanned both times. It will also identify all items that are present in both scans.

Product.

The product functionality allows searches of all items scanned by the user. In addition, as the web portal permits, it also allows the user to upload product files and vendor files (FIG. 3). In a retail context, both of these files are critical to the system as the basis of the database, it matches product information with UPCs and vendor information with department.

History.

The history functions allows the user to track all necessary data in the system. This includes scan history, product history, and upload history. Any modifications or movement of items are recorded and tracked in the database. The web portal 195, with appropriate permission, allows the user to look at and search all of the histories in the system, and identify who made modifications to the system.

Figure 10:
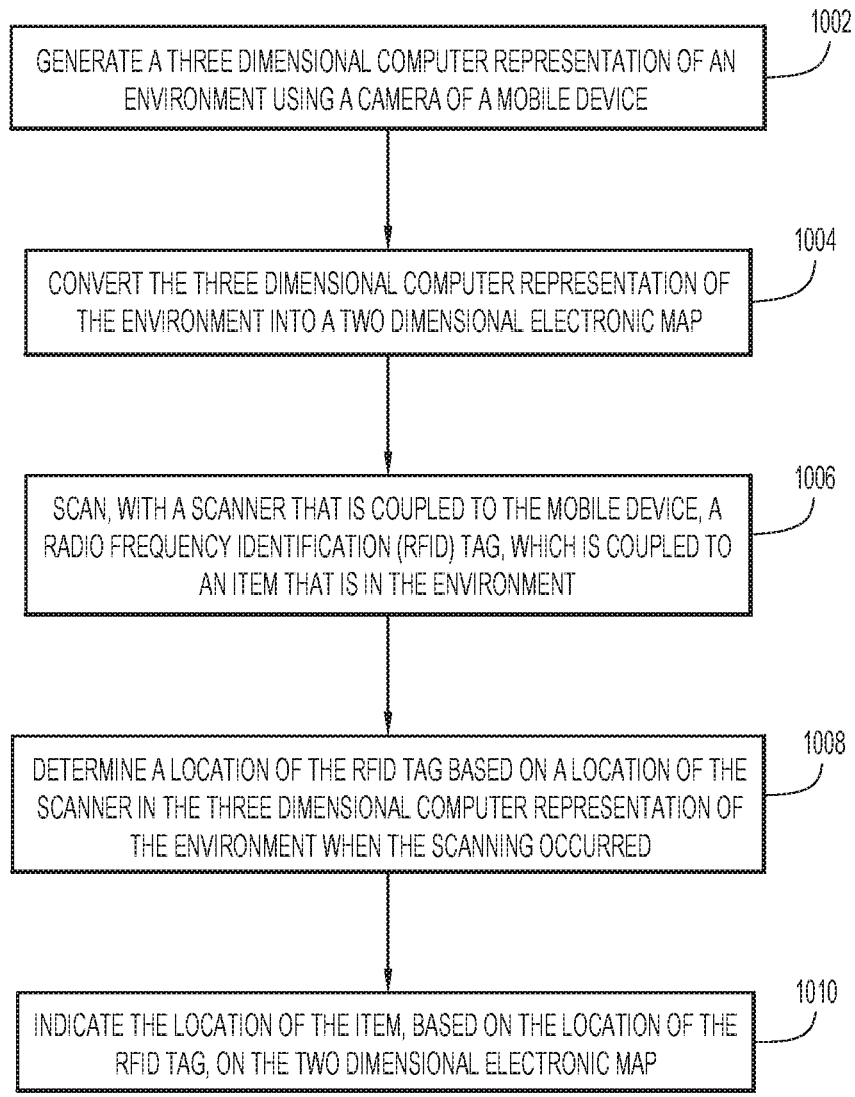
FIG. 10 is another flowchart illustrating a series of operations according to an embodiment of the invention.

FIG. 10 is another flowchart illustrating a series of operations according to an embodiment of the invention. The operations depicted may be performed entirely by the mobile device 100, and/or with computing and storage support from server 200. The operations may be performed under the control of mobile inventory and mapping logic 140 and, as needed, backend inventory and mapping logic 240.

At 1002 the system generates a three dimensional computer representation of an environment using a camera of a mobile device. At 1004, the system converts the three dimensional computer representation of the environment into a two dimensional electronic map. At 1006, the system scans, with a scanner that is coupled to the mobile device, a radio frequency identification (RFID) tag, which is coupled to an item that is in the environment. At 1008, the system determines a location of the RFID tag based on a location of the scanner in the three dimensional computer representation of the environment when the scan occurred. And at 1010, the system indicates the location of the item, based on the location of the RFID tag, on the two dimensional electronic map.

While the invention has been described in terms of what is presently considered to be the most practical and preferred embodiments, it is to be understood that the invention need not be limited to such disclosed embodiments. Rather, the claims below are it is intended to cover various modifications and similar arrangements included within the spirit and scope of the present invention and be accorded with the broadest interpretation so as to encompass all such modifications and similar structures.

What is claimed is:

1. A method comprising:
generating a three dimensional computer representation of an environment using a camera of a mobile device;
converting the three dimensional computer representation of the environment into a two dimensional electronic map;
scanning, with a scanner that is coupled to the mobile device, a tag, which is coupled to an item that is in the environment;
while scanning, tracking a location of the scanner in the three dimensional computer representation of the environment using the three dimensional computer representation of the environment;
determining a location of the tag based on the location of the scanner in the three dimensional computer representation of the environment when the scanning occurred, wherein determining the location of the tag comprises collecting readings from the tag corresponding to respective locations of the scanner during the scanning operation; and
indicating the location of the item, based on the location of the tag, on the two dimensional electronic map.

2. The method of claim 1, further comprising displaying, on a display, the electronic map along with an indication of the location of the item.

3. The method of claim 1, wherein determining the location of the tag comprises calculating a centroid of a polygon whose vertices correspond to the respective locations of the scanner when the scanner received signals from the tag.

4. The method of claim 3, further comprising, before calculating the centroid of the polygon, filtering the signals, and corresponding respective locations of the scanner, by eliminating, from the calculating, signals below a predetermined received signal strength.

5. The method of claim 4, wherein eliminating signals comprises eliminating signals that are below about the top 10% of all received signal strengths.

6. The method of claim 1, further comprising storing, in a database, and in association with one another, information about the item and the location of the item.

7. The method of claim 6, wherein the information about the item comprises at least one of an electronic product code (EPC), a universal product code (UPC), a color, a size, a brand, a vendor, or a department.

8. The method of claim 1, further comprising, when subsequently searching for the item using the mobile device, displaying on a display of the mobile device a camera view of the environment along with augmented reality information associated with the item.

9. The method of claim 8, wherein the augmented reality information comprises at least one of item quantity, department, vendor, color, size, an arrow indicative of a direction towards the location of the item or an icon indicating the location of the item.

10. The method of claim 1, wherein the tag is a radio frequency identification (RFID) tag.

11. An inventory system, comprising:
a mobile device comprising a camera, a display and a scanner; and
a server, communicatively coupled to the mobile device;
the system configured to:
generate a three dimensional computer representation of an environment using the camera;
convert the three dimensional computer representation of the environment into a two dimensional electronic map;
scan, with the scanner, a tag, which is coupled to an item that is in the environment;
at a same time as the scan, track a location of the scanner in the three dimensional computer representation of the environment using the three dimensional computer representation of the environment;
determine a location of the tag based on the location of the scanner in the three dimensional computer representation of the environment when the scan occurred, by collecting readings from the tag corresponding to respective locations of the scanner during the scan; and
indicate the location of the item, based on the location of the tag, on the two dimensional electronic map.

12. The inventory system of claim 11, wherein the mobile device is configured to display, on the display, the electronic map along with an indication of the location of the item.

13. The inventory system of claim 11, wherein the server determines the location of the tag by calculating a centroid of a polygon whose vertices correspond to the respective locations of the scanner when the scanner received signals from the tag.

14. The inventory system of claim 13, wherein the server, before calculating the centroid of the polygon, is configured to filter the signals, and corresponding respective locations of the scanner, by eliminating, from the calculating, signals below a predetermined received signal strength.

15. The inventory system of claim 14, wherein the server is configured to eliminate signals that are below about the top 10% of all received signal strengths.

16. The inventory system of claim 11, wherein the server is configured to store, in a database, and in association with one another, information about the item and the location of the item.

17. The inventory system of claim 16, wherein the information about the item comprises at least one of an electronic product code (EPC), a universal product code (UPC), a color, a size, a brand, a vendor, or a department.

18. The inventory system of claim 11, wherein, when subsequently searching for the item using the mobile device, the mobile device is configured to display on the display a camera view of the environment along with augmented reality information associated with the item.

19. The inventory system of claim 18, wherein the augmented reality information comprises at least one of item quantity, department, vendor, color, size, an arrow indicative of a direction towards the location of the item or an icon indicating the location of the item.

20. The inventory system of claim 18, wherein the tag is a radio frequency identification (RFID) tag.

* * * * *